Figure 2:
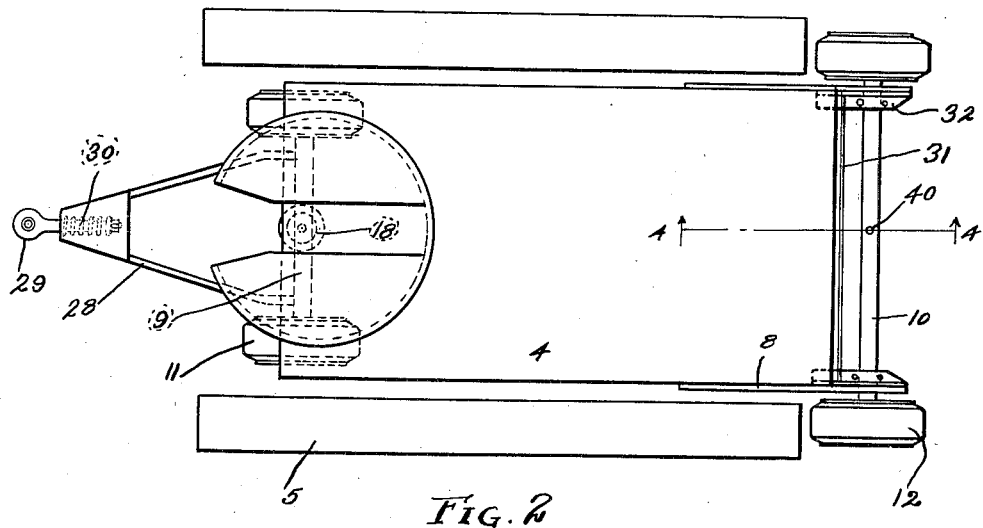

Aug. 30, 1932.  C. H. LOTTE  1,874,558
TRAILER
Filed Oct. 28, 1930  2 Sheets-Sheet 1

INVENTOR.
Charles H. Lotte
BY
Fay Oberlin & Fay
ATTORNEYS.

Aug. 30, 1932.  C. H. LOTTE  1,874,558
TRAILER
Filed Oct. 28, 1930   2 Sheets-Sheet 2
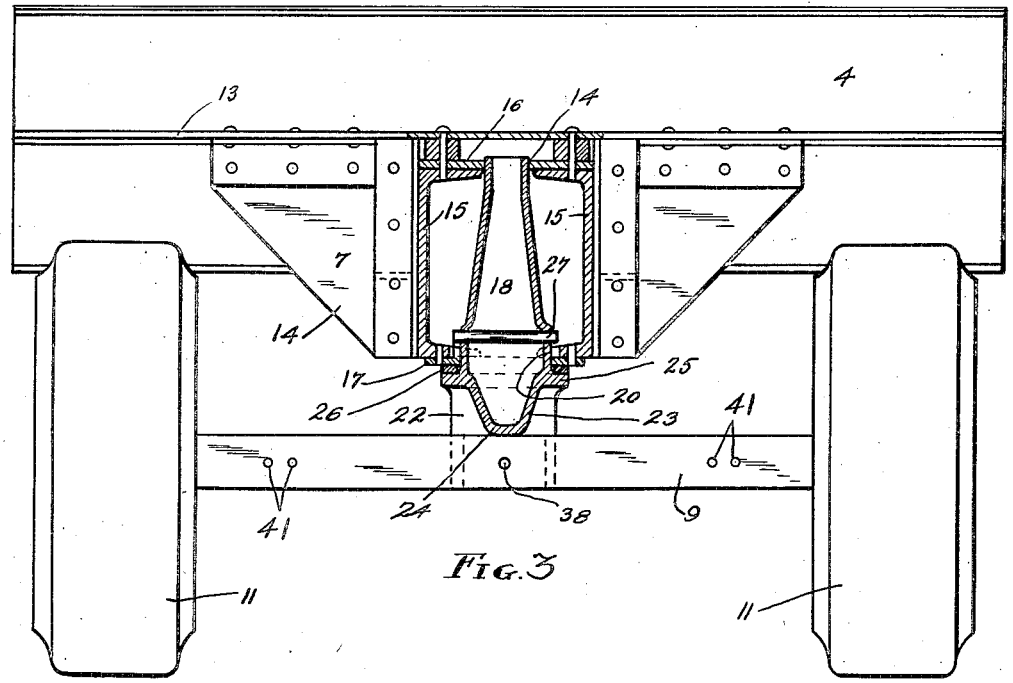
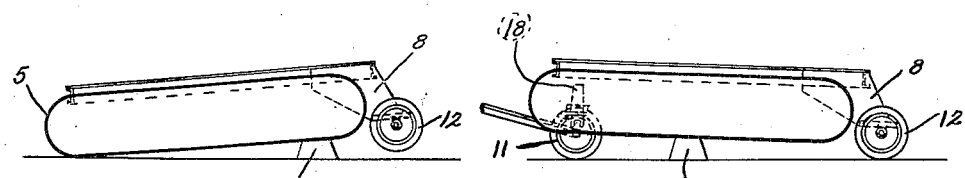
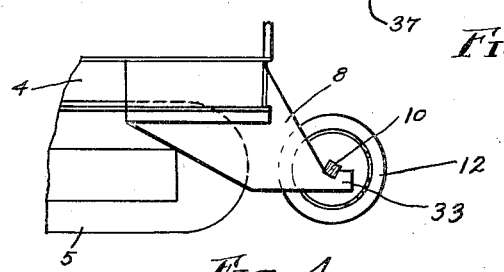
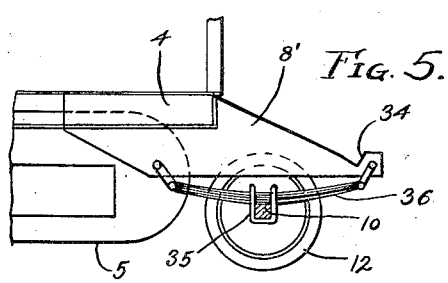
INVENTOR.
Charles H. Lotte
BY
Fay Oberlin & Fay
ATTORNEYS.

Patented Aug. 30, 1932

1,874,558

UNITED STATES PATENT OFFICE

CHARLES H. LOTTE, OF RAVENNA, OHIO, ASSIGNOR TO BYERS MACHINE COMPANY, OF RAVENNA, OHIO, A CORPORATION OF MARYLAND

TRAILER

Application filed October 28, 1930. Serial No. 491,695.

This invention is of general application to land vehicles, particularly those of a heavy and cumbersome type adapted primarily for movement at low speeds on yielding surfaces, such as soft earth, and relates to means for enabling such vehicles to be moved more rapidly from place to place on surfaces which offer greater supporting power and where the load consequently need not be so widely distributed.

Although it is herein illustrated and described as applicable to excavating machines movable upon traction devices of the crawler type, the invention will be equally valuable for other types of heavy machinery such as low speed tractors per se, heavy artillery and numerous other uses. Also, while particularly useful in connection with crawler type apparatus, this invention is also capable of use with any apparatus including wheel type, where the primary propelling means are limited to relatively low speeds.

Contractors who make use of excavating machines find the earning power of these machines limited by the slowness of transport from one job to another, inasmuch as they are capable of moving at rates varying from about one-half to four miles per hour under their own power. To overcome this disadvantage, low trucks of heavy construction are used. The machine is run into the truck under its own power and the truck is then towed to the next scene of operation at speeds on the order of twenty miles an hour. Such trucks are expensive, costing from $1,500 upward and are of little or no use except for the specialized purpose, consequently stand idle a great part of the time. Also they occupy a great deal of ground space for their disposition when not in use which is a problem, particularly on street work in cities where storage space for tools and machinery is difficult to find. Thus the use of such a truck usually necessitates that it be returned idle to the contractor's material yard and kept there until it is again needed, when it must be brought empty to the excavating machine.

The apparatus of this invention, on the other hand, costs much less than such a truck and occupies but little space when not in use. Indeed, under most working conditions the supplemental transporting means can be constantly carried upon or immediately adjacent to the excavating machine.

It will be understood that the accompanying drawings and following specifications are illustrative of a preferred embodiment of the invention but are not of a limiting nature, since other applications and forms of mechanism may be employed to accomplish the purpose.

Figure 1:
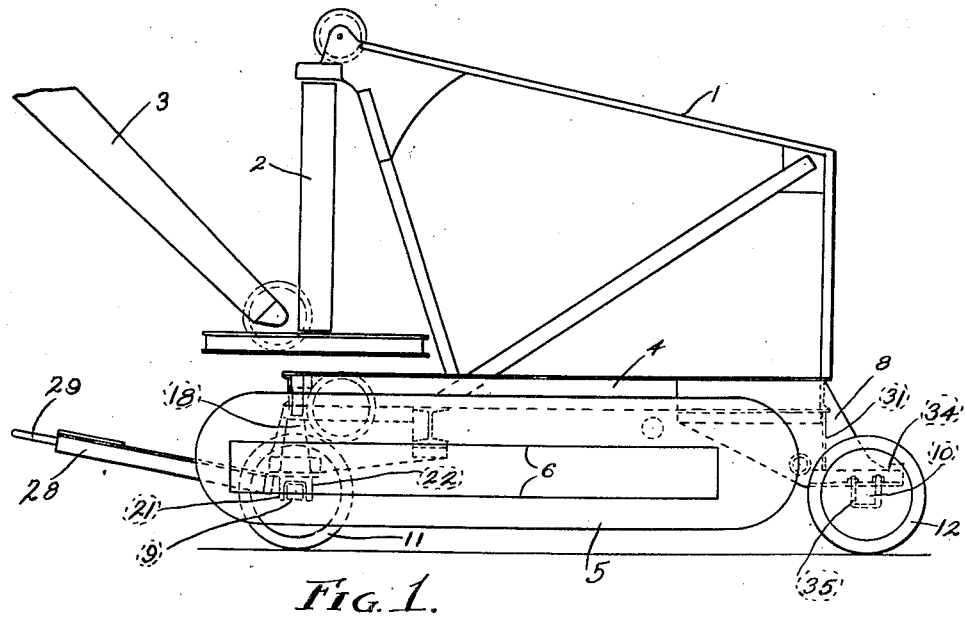

In the drawings Fig. 1 is a side view of the trailer in operative position upon an excavating machine; Fig. 2 is a plan view of the same, omitting the superstructure; Fig. 3 is a front elevation, partly in section, of the front truck; Fig. 4 is a diagrammatic view on the line 4—4 of Fig. 2 showing the method of transporting the rear wheels when not in use; Fig. 5 is a view corresponding to Fig. 4 showing a method of applying a spring to a wheel; Figs. 6 and 7 are diagrammatic side elevations illustrating a method of applying or removing the trailer elements without the use of a jack.

In Fig. 1 I have illustrated an excavating machine of conventional type, indicating diagrammatically a frame work 1, mast 2 and boom 3, all supported upon a bed or framing 4 which is arranged to be moved, usually under power supplied from the machine, by means of crawlers 5 attached thereto in a conventional manner, the attaching means being indicated in diagrammatic style in Fig. 1 by side truck frames 6.

The bed framing 4 has permanently attached thereto, as by rivets, bolts, welding, or other suitable means, connecting elements such as the structure 7 to the front end and connecting elements such as the brackets 8 at the rear end. These elements 7 and 8 are adapted to connect axles 9 and 10, respectively, to the framing 4. Such axles carry on each end wheels 11 and 12 on which the machine can run with the crawlers clear of the ground, as indicated in Fig. 1.

While the detailed formation of these connecting means may vary according to circumstances, a convenient construction for the front end comprises a built-up box attached to a cross sill such as 13 of the bed frame 4, as by means of gusset plates 14. This box element is here shown as comprising short longitudinal channels 15—15 held in place by the gusset plates 14 and spaced apart by means of top and bottom bearing plates 16 and 17 which afford side support for a vertical king pin 18. This king pin or trunnion may conveniently be formed as a heavy, hollow casting having upper and lower short cylindrical journal sections 19 and 20, working in the bearing plates 16 and 17 respectively. The trunnion is further formed, below the portion 20, with a transverse bifurcation having front and rear plates 21, 22 adapted to receive the front axle 9 of the wheel traction means. The center of the forked portion of the trunnion extends downward as at 23 to a transverse portion 24 which is somewhat rounded off, as indicated in Fig. 3, bearing directly against the top of axle 9 and so transmitting the weight of the machine to the axle when the machine travels on wheels. At the top of the bifurcations 21, 22 a horizontal flange 25 extends out, circumferentially beyond the cylindrical section 20. The upper surface of this flange 25 bears against a collar 26 upon which, in turn, the plate 17 rests. A horizontal pin 27 extends through the trunnion 18 at the top of the section 20, thus preventing the trunnion from dropping out when the weight of the machine is supported by the crawlers 5.

It will thus be seen from Figs. 2 and 3 that the axle 9 is held in place by the downward projection 24 and by the fork elements 21 and 22, so that this axle can rock in a vertical plane against the member 24 when either wheel 11 strikes an irregularity in the roadway, but so that turning movements for steering the machine, are transmitted to the trunnion 18.

A tongue 28 of suitable heavy construction is connected to the axle 9, as indicated at 41, Fig. 3, but the connections are omitted from Fig. 3 for the sake of clearness. This tongue is preferably provided with a large eyebolt 29 secured therein and equipped with buffer springs 30, this arrangement being merely a convenient and customary device for a towing coupling to a truck.

The rear end brackets 8 are riveted or otherwise secured to the rear part of the sides of the bed frame 4 and are closely connected by a transverse plate 31 for additional stiffness. In the form here shown these brackets are strengthened at the bottom by inturned flanges 32. As best seen in Fig. 4, the brackets extend rearwardly in a general trapezoidal shape and have a shallow rear extension 33 which, with the main body of the bracket, forms a notch such as 34 into which the axle 10 is dropped when the wheels are not in use.

When the wheels are in use the axle 10 is secured beneath the flanges 32 by U-bolts 35.

Brakes, not shown, of any suitable type, may be applied either to the rear wheels 12 or to all of the wheels. If deemed advisable, any desired type of spring connection may be used between the axles and the machine, one possible arrangement being illustrated by the leaf spring 36 in Fig. 5. It will also be understood that either solid or pneumatic tires may be employed and that dual wheels may be used, or other changes in detail may be made.

For convenience the front axle 9 is shorter than the rear axle 10, so that the front wheels 11 will set well within the crawlers 5 and have room for sufficient angular movement for the axle 9 to allow steering of the machine when being towed. The rear axle 10 is wider so that the rear wheels 12 afford practically as wide spread support to the machine as do the crawlers 5.

In operation a convenient way of applying the wheels is that shown in Figs. 6 and 7. In Fig. 6 the machine has been run backwards up onto a pair of blocks 37, thus lifting the rear end high enough off the ground so that the wheels 12 and axle 10 can be run beneath the brackets 8 thus permitting the axle to be secured thereto by means of the U-bolts 35. In this position the weight of the machine is still on the blocks 37 and the crawlers are run further backwards until the front end of the machine is elevated enough, as shown in Fig. 7, to permit the axle 9 to be run under the forked members 21, 22, whereupon the machine is lowered to permit a bolt 38 to be passed through matching holes in the forked portions 21 and 22 and the axle 9. The function of this bolt is not to carry the weight of the machine but merely to prevent the axle from shifting. The weight of the machine is still on the crawlers, but their further operation in either direction will run them off the blocks 37 so that the entire weight is supported by the wheels. The reverse of the above described method is of course used when the wheels are to be removed. Thus it is not necessary to use a jack with the machine, but simply to have a pair of blocks 37 of greater height than the distance which the wheels lift the crawlers off the ground.

When the machine is running on its crawlers, as in digging operations, the rear wheels are supported by lifting the axle 10 in the notch 34 as shown in Fig. 4, and are thus out of the way but always available. In case the rear end of the machine should dip down, the entire weight will still rest upon the crawlers and the wheels 12 will simply lift the axle 10 out of the notch, since it is supported therein only by gravity. If desired as a matter of convenience, the front axle 9, wheels 11 and tongue 28 can be pulled along behind the machine by connecting the eye 29 to a suitable fastening such as indicated at 40, Fig. 2, so that the front wheel truck may be thus constantly towed and always available. By carrying the blocks 37 in the cab of the machine, the machine even when operating on the crawlers as an excavator, can always have immediately with it everything necessary to put it on the wheels for towing. Ordinarily it will be more convenient to keep the front truck assembly 9, 11, 28 with other tools stored near the scene of operation.

It will be seen from the foregoing that I have invented an attachment whereby a power shovel, power frame, tractor or other similar slow moving machinery, usually of the self-propelling type at its low speeds, can have always with it all elements which are necessary to enable it to be towed behind a truck or other motive power at higher speeds.

Although I have above shown and described a preferred form of mechanism whereby my invention may be embodied, it is to be understood that I do not confine myself thereto, but that the description is to be taken as an illustrative application of the principles involved and that the scope of the invention is defined by the appended claim:

In a land vehicle adapted for selective traction upon propelling crawlers or other propelling means, two axles each having a wheel at each end, an immovable bracket upon the vehicle frame at one end adapted to bear directly upon one of said axles, a vertically immovable king pin upon the vehicle frame at the other end adapted to bear directly upon the other said axle, the radius of each of said wheels being greater than the vertical distance from the plane of the bottoms of the crawlers to the surfaces of said bracket and king pin respectively which bear upon the respective axles.

Signed by me this 23 day of October, 1930.

CHARLES H. LOTTE.